US008792826B2

(12) United States Patent
Willis

(10) Patent No.: US 8,792,826 B2
(45) Date of Patent: Jul. 29, 2014

(54) METHODS FOR DETERMINING PROXIMITY BETWEEN RADIO FREQUENCY DEVICES AND CONTROLLING SWITCHES

(75) Inventor: Nicholas Hedley Willis, Remuera (NZ)

(73) Assignee: Eckey Corporation, Wilmington, DE (US)

( * ) Notice: Subject to any disclaimer, the term of this patent is extended or adjusted under 35 U.S.C. 154(b) by 436 days.

(21) Appl. No.: 12/295,670

(22) PCT Filed: Apr. 2, 2007

(86) PCT No.: PCT/NZ2007/000069
§ 371 (c)(1),
(2), (4) Date: Oct. 1, 2008

(87) PCT Pub. No.: WO2007/114716
PCT Pub. Date: Oct. 11, 2007

(65) Prior Publication Data
US 2009/0156126 A1    Jun. 18, 2009

(30) Foreign Application Priority Data

Apr. 3, 2006 (NZ) .......................................... 546314
Jun. 22, 2006 (NZ) .......................................... 548085

(51) Int. Cl.
*H04B 7/00* (2006.01)
(52) U.S. Cl.
USPC ................... 455/41.2; 455/67.11; 455/456.1; 455/435.1
(58) Field of Classification Search
None
See application file for complete search history.

(56) References Cited

U.S. PATENT DOCUMENTS

| 4,534,194 | A | | 8/1985 | Aydin |
| 5,692,019 | A | * | 11/1997 | Chang et al. ................... 375/347 |
| 6,052,598 | A | * | 4/2000 | Rudrapatna et al. ....... 455/456.1 |
| 6,055,321 | A | | 4/2000 | Numao et al. |
| 6,091,808 | A | * | 7/2000 | Wood et al. .............. 379/201.04 |
| 6,564,056 | B1 | | 5/2003 | Fitzgerald |
| 6,622,912 | B2 | | 9/2003 | Tejedor Ruiz |
| 6,785,272 | B1 | * | 8/2004 | Sugihara ....................... 370/386 |
| 6,985,695 | B1 | | 1/2006 | Kato |
| 6,985,697 | B2 | | 1/2006 | Smith et al. |
| 7,031,660 | B2 | | 4/2006 | Vonheim et al. |
| 7,158,756 | B2 | | 1/2007 | Palin et al. |

(Continued)

FOREIGN PATENT DOCUMENTS

| DE | 4316867 A1 * | 11/1994 |
| EP | 1 612 999 | 1/2006 |

(Continued)

OTHER PUBLICATIONS

Hellebrandt et al., Estimating Position and Velocity of Mobiles in a Cellular Radio Network, Feb. 1997, IEEE Transaction on Vehicular Technology, vol. 46, No. 1, pp. 6571.*

(Continued)

*Primary Examiner* — Fayyaz Alam
*Assistant Examiner* — Mohammed Rachedine
(74) *Attorney, Agent, or Firm* — Iandiorio Teska & Coleman, LLP

(57) ABSTRACT

The invention relates to a method of determining the proximity of radio frequency devices using the analysis of a series of receive signal strength indicator (RSSI) values. In particular the invention further relates to a method for the control of a switch based on the proximity of the radio frequency devices.

22 Claims, 10 Drawing Sheets

(56) References Cited

U.S. PATENT DOCUMENTS

| | | | |
|---|---|---|---|
| 7,360,248 B1 | 4/2008 | Kanevsky et al. | |
| 7,856,209 B1 * | 12/2010 | Rawat | 455/67.11 |
| 2002/0059238 A1 | 5/2002 | Saito | |
| 2003/0117293 A1 * | 6/2003 | Tang et al. | 340/825.72 |
| 2004/0114779 A1 | 6/2004 | Blazey | |
| 2004/0169589 A1 * | 9/2004 | Lea et al. | 340/825.49 |
| 2004/0235455 A1 | 11/2004 | Jiang | |
| 2005/0027982 A1 | 2/2005 | Haparnas et al. | |
| 2005/0044906 A1 | 3/2005 | Spielman | |
| 2005/0242921 A1 | 11/2005 | Zimmerman et al. | |
| 2005/0254652 A1 | 11/2005 | Engler et al. | |
| 2006/0068760 A1 | 3/2006 | Hameed et al. | |
| 2006/0128305 A1 | 6/2006 | Delalat | |
| 2006/0135065 A1 | 6/2006 | Lee et al. | |
| 2007/0200665 A1 | 8/2007 | Studerus | |
| 2008/0066080 A1 | 3/2008 | Campbell | |
| 2008/0279158 A1 | 11/2008 | Schmidt et al. | |
| 2008/0294778 A1 | 11/2008 | Wang et al. | |
| 2009/0100530 A1 | 4/2009 | Chen | |
| 2011/0001603 A1 | 1/2011 | Willis | |
| 2012/0108208 A1 | 5/2012 | Willis | |

FOREIGN PATENT DOCUMENTS

| | | |
|---|---|---|
| KR | 10-2005-0040644 A | 5/2005 |
| WO | WO-01/58098 | 8/2001 |
| WO | WO 01/63425 A1 | 8/2001 |
| WO | WO 02/095689 A1 | 11/2002 |
| WO | WO-2005/107094 | 11/2005 |
| WO | WO 2006/098690 A1 | 9/2006 |
| WO | WO 2008/070886 A2 | 6/2008 |
| WO | WO 2009/075589 A2 | 6/2009 |
| WO | WO 2010/090533 A2 | 8/2010 |

OTHER PUBLICATIONS

Written Opinion of the International Searching Authority for International Application No. PCT/NZ2008/000319, mailed May 7, 2010 (six (6) pages).

Written Opinion of the International Searching Authority for International Application No. PCT/NZ2010/000002, mailed Jul. 30, 2010 (eight (8) pages).

Written Opinion of the International Searching Authority for International Application No. PCT/NZ2007/00069, mailed Jul. 31, 2007 (three (3) pages).

Puech et al., "A New Crypto-Watermarking Method for Medical Images Safe Transfer", Proc. 12$^{th}$ European Signal Processing Conference (EUSIPCO '04), pp. 1481-1484, Vienna, Austria, Sep. 2004 (four (4) pages).

* cited by examiner

METHODS FOR DETERMINING PROXIMITY BETWEEN RADIO FREQUENCY DEVICES AND CONTROLLING SWITCHES

FIELD OF THE INVENTION

The invention relates to a method of determining the proximity of a first radio frequency device to a second radio frequency device.

The invention further relates to a method for the control of a switch based on the proximity to each other of a first radio frequency device and a second radio frequency device.

BACKGROUND

RSSI is a measure of the signal strength between transmitting and receiving devices. RSSI is a measure of the strength (not necessarily the quality) of the received signal in a radio frequency environment.

RSSI is measured in arbitrary units. RSSI can be used internally in a radio frequency networking card to determine when the signal is below a certain threshold. This allows determination of the type of messages to send as well as the timing for those messages.

A radio frequency network monitoring tool can be used to measure the signal strength of a wireless network. From this a RSSI value can be determined. An end-user can determine an RSSI value when measuring the signal strength of a wireless network on a radio frequency network monitoring tool.

RSSI values are used in a range of situations including the transmission of signals over wires and in various radio frequency technologies including the General Packet Radio Service (GPRS), Global System for Mobile Communications (GSM), Code division multiple access (CDMA), Bluetooth™, ZigBee™, Wifi 802.11x, and other Radio Frequency Identification (RFID) methods.

The value of RSSI measurements will vary depending on the implementation and the chosen scale, but is usually an integer value where a low value indicates a low signal strength. According to the IEEE802.11 standard:

RSSI is intended to be used in a relative manner. Absolute accuracy of the RSSI reading is not specified.

When transmitting messages between devices the RSSI is a useful guide to the strength of the signal whether measured in Watts (W) or Decibels (dB).

While other factors come into play, distance has the greatest impact on signal strength in a radio frequency environment. In general, the strength of the signal (ss) is understood to be proportional to the inverse square of the distance (d):

$$ss \propto 1/d^2$$

Signal strength (ss) and RSSI can be used as a guide to the distance between transmitting and receiving radio frequency devices.

RSSI is used in different ways depending on what the primary objective is.

When the transmission of messages is the aim, the relative distance of the transmitting and receiving devices is not important. Only the strength and quality of the signal is important in this case.

Where the proximity of two objects is the key criterion, for example with location based services or security applications, the strength of the signal is not important. However, the relative physical locations of the objects will be important.

In each case, fluctuations in the RSSI are prevalent. These are due to various reasons including changes in distance, interference from external material such as wood or metal between the radio frequency devices, and environmental conditions.

In order to more fully exploit the use of radio frequency devices in the provision of location based services or security applications a need exists to determine the distance between such devices or relative change of distance between such devices, given the presence of these fluctuations.

The provision of location based services or security applications requires the operation of switches. Various means and mechanisms for remotely controlling switches are known. The remote control of switches can be used to allow or restrict access to buildings or premises. In addition, remote control devices are well known for locking and unlocking cars, garages and the like. Further, remote control devices can be used in combination with electronic devices such as alarm systems, lights, televisions, stereos and DVD players.

Remote controls typically require some kind of action on the part of a user to operate them. There may be a button which a user has to depress in order to obtain operation of the device, for example, the unlocking of a door. Alternately, the user may be required to put a key within a lock. These requirements can be inconvenient if the user has already got their hands full, for example, if they are carrying bags or other items or if a user is already operating another device, for example, driving a car.

Systems have been proposed which utilise the radio frequency technology Bluetooth™ to allow operation of a switch. However, typically these systems require the device to be discoverable (visible to inquiry) and/or to connect to a specific application on a specific profile. An example of such a system is described in the specification accompanying international application no. PCT/SE01/00285 (publication no. WO 01/63425).

Wide scale utilisation of the radio frequency technology Bluetooth™ in the system described in WO 01/63425 has limitations as many Bluetooth devices are not permanently discoverable. Action is required on the part of the user to change the status of the device to make it discoverable.

It is an object of the invention to provide an improved method for determining the proximity or relative changes in proximity between radio frequency devices.

It is an object of the invention to provide a method for controlling a switch based on the proximity or relative changes in proximity between radio frequency devices.

These objects are to be read disjunctively with the object to at least provide the public with a useful choice.

STATEMENTS OF INVENTION

In a first aspect the invention provides a method for determining the proximity to each other of radio frequency devices including the steps of:
  a receiving radio frequency device periodically measuring the RSSI value of a transmitting radio frequency device to provide a series of results; and
  analysing the series of results using at least one technical indicator.

Preferably, the analysing the series of results includes determining the change in proximity to each other of the radio frequency devices.

Preferably, the at least one technical indicator is selected from the group consisting of: an exponential moving average; a moving average convergence/divergence.

Preferably, the at least one technical indicator is a combination of an exponential moving average and a moving average convergence/divergence.

Preferably, the two or more radio frequency devices operate in the 2.4 GHz radio bands Preferably, the radio frequency devices support a radio frequency communication method selected from the group consisting of: General Packet Radio Service; GSM; CMDA; Bluetooth™; ZigBee™; Wifi; 802.11x.

Preferably, the radio frequency devices support the Bluetooth™ radio frequency communication method.

Preferably, the transmitting and receiving radio frequency devices communicate in accordance with the Bluetooth™ specification.

Preferably, the periodically measuring the RSSI value of a transmitting radio frequency device occurs in the absence of a profile dependent connection being formed between the radio frequency devices.

Preferably, the transmitting radio frequency device is authenticated by Bluetooth™ pairing with the receiving radio frequency device but is undiscoverable during the periodically measuring the RSSI value.

In a second aspect the invention provides a configuration of radio frequency devices including:
 a transmitting radio frequency device; and
 a receiving radio frequency device capable of functioning to periodically measure the RSSI value of the transmitting radio frequency device to provide a series of results.

Preferably, the receiving radio frequency device is programmed to analyse the results using at least one technical indicator to determine the proximity of the transmitting and receiving devices.

Preferably, the analysing the results includes determining the change in proximity to each other of the radio frequency devices.

Preferably, the at least one technical indicator is selected from the group consisting of: an exponential moving average; a moving average convergence/divergence.

Preferably, the at least one technical indicator is a combination of an exponential moving average and a moving average convergence/divergence.

Preferably, the radio frequency devices are capable of operating in the 2.4 GHz radio bands Preferably, the transmitting and receiving radio frequency devices are capable of communicating in accordance with the Bluetooth™ specification.

Preferably, the periodically measuring the RSSI value of a transmitting radio frequency device is capable of occurring in the absence of a profile dependent connection being formed between the two or more radio frequency devices.

Preferably, the transmitting radio frequency device is capable of being authenticated by Bluetooth™ pairing with the receiving radio frequency device but is undiscoverable during the periodically measuring the RSSI value.

Preferably, the receiving device is capable of providing personal area networking connection to serve HTML pages to administer the configuration.

In a third aspect the invention provides a receiving radio frequency device capable of functioning to periodically measure the RSSI value of a transmitting radio frequency device to provide a series of results and programmed to analyse the results using at least one technical indicator to determine the proximity of the transmitting and receiving radio frequency devices.

Preferably, the at least one technical indicator is selected from the group consisting of: an exponential moving average; a moving average convergence/divergence.

Preferably, the at least one technical indicator is a combination of an exponential moving average and a moving average convergence/divergence.

Preferably, the receiving device operates in the 2.4 GHz radio bands.

Preferably, the receiving radio frequency device supports a radio frequency communication method selected from the group consisting of: General Packet Radio Service; GSM; CMDA; Bluetooth™; ZigBee™; Wifi; 802.11x.

Preferably, the receiving radio frequency device supports the Bluetooth™ radio frequency communication method.

Preferably, the receiving radio frequency device communicates in accordance with the Bluetooth™ specification.

Preferably, the receiving radio frequency device provides personal area networking connection to serve HTML pages.

In a fourth aspect the invention provides a chip set solution for use in the manufacture of a radio frequency device providing functionality to periodically measure the RSSI value of a transmitting radio frequency device to provide a series of results and analyse the results using at least one technical indicator to determine the proximity of the transmitting radio frequency device.

Preferably, the analysing the results includes determining the change in proximity of the transmitting radio frequency devices.

Preferably, the at least one technical indicator is selected from the group consisting of: an exponential moving average; a moving average convergence/divergence.

Preferably, the at least one technical indicator is a combination of an exponential moving average and a moving average convergence/divergence.

Preferably, the chip set solution is for use in the manufacture of a radio frequency device operating in the 2.4 GHz radio bands.

Preferably, the chip set solution is for use in the manufacture of a radio frequency device supporting a radio frequency communication method selected from the group consisting of: General Packet Radio Service; GSM; CMDA; Bluetooth™; ZigBee™; Wifi; 802.11x.

Preferably, the chip set solution is for use in the manufacture of a radio frequency device supporting the Bluetooth™ radio frequency communication method.

In a fifth aspect the invention provides a method of operating a switch including the step of determining the proximity to each other of radio frequency devices.

Preferably, the determining the proximity includes the steps of:
 a receiving radio frequency device periodically measuring the RSSI value of a transmitting radio frequency device to provide a series of results; and
 analysing the results using at least one technical indicator.

Preferably, the analysing the series of results includes determining the change in proximity to each other of the radio frequency devices.

Preferably, the at least one technical indicator is selected from the group consisting of: an exponential moving average; a moving average convergence/divergence.

Preferably, the at least one technical indicator is a combination of an exponential moving average and a moving average convergence/divergence.

Preferably, the periodically measuring the RSSI value of a transmitting radio frequency device occurs in the absence of a profile dependent connection being formed between the radio frequency devices.

Preferably, the transmitting radio frequency device is authenticated (by Bluetooth™ pairing) with the receiving radio frequency device but is undiscoverable during the periodically measuring the RSSI value.

Preferably, the receiving radio frequency device is administered by use of the exchange of Business Cards (OBEX profile).

Preferably, the receiving radio frequency device provides a personal area networking connection to serve HTML pages to administer the system.

Preferably, a signal from at least one of the radio frequency devices is generated in response to the change in proximity of the two or more radio frequency devices.

Preferably, authenticating identification information is obtained in response to a signal from at least one of the radio frequency devices.

Preferably, the authenticated identification information is shared with another system, application or process.

Preferably, the switch is actuated in response to a signal from at least one of the radio frequency devices.

Preferably, the signal from at least one of the radio frequency devices is generated when a predetermined proximity-threshold is reached.

The proximity-threshold can be determined by the user of the method depending on the specific requirements.

Preferably, the proximity-thresholds are dynamically tuned based on the occurrence of false positive incidents.

Preferably, the radio frequency devices are paired Bluetooth™ devices.

Preferably, the two or more radio frequency devices operate in the 2.4 GHz radio bands Preferably, the radio frequency devices support a radio frequency communication method selected from the group consisting of: General Packet Radio Service; GSM; CMDA; Bluetooth™; ZigBee™; Wifi; 802.11x.

Preferably, the radio frequency devices support the Bluetooth™ radio frequency communication method.

Preferably, the transmitting and receiving radio frequency devices communicate in accordance with the Bluetooth™ specification.

Preferably, devices include mobile telephones, laptops or other devices including a transmitting and receiving processor.

Preferably, the switch governs the opening or closing of a door selected from the group consisting of: a garage door; a car door; or a security door.

The switch may be operable to perform, directly or indirectly, various operations, including without limitation, an electrical or software switch turning a device or product on or off, opening or closing a door, releasing a catch, locking or unlocking a door or window or the like.

Similarly the switch may be used in association with existing automatic door openers such as those which are commonly used in, for example, cars, garages, cat and dog doors and at entrances to commercial or domestic premises.

Similarly the switch may be used to trigger another software application for application to other location based services such as mapping a device location, asset tracking, routing, proximity based messaging, including guides, advertising, ticketing, security and safety.

"Authentication" means the initiation by the switch controller of the remote device and involves the Bluetooth™ paging process.

"Bluetooth™" means the industrial specification for wireless personal area networks that provides a mechanism for exchanging information between cell phones, pocket PCs, PDAs and the like. The protocol centres around short range radio frequency.

"Discoverable device" means a device that responds to inquiry requests. Many devices are only temporarily discoverable and so can not be passively identified through inquiry.

"Pairing" means when two Bluetooth™ capable devices establish a trusted relationship through the standard Bluetooth mechanism.

"Periodically measuring" means repeatedly measuring a parameter at a predetermined interval of time.

"Profile dependent connection" means a connection that is formed between two Bluetooth devices using one of the profiles (such as Serial Port or Headset) defined in the Bluetooth specification which occurs above the RFCOMM layer in the Bluetooth communication stack in FIG. 6.

"Radio frequency device" means a device capable of transmitting or receiving electro-magnetic waves at specified radio frequencies. Suitable devices may include mobile telephones/cellphones, cell towers, car and portable radios, GPS receivers, RFID readers and transmitters, laptops or other devices including a transmitting and/or receiving processor.

"Switch" means a device which directly or indirectly changes a device from one state to another. By way of example, a switch may change the state of a lock from locked to unlocked, or of an electronic device from on to off, or trigger an action in a program.

"Technical indicator" means the mathematical measures that are traditionally used in financial market analysis to study the historical prices over time of any type of traded security (stocks, commodities, etc.) to attempt to predict future prices. Here we show how these same indicators can be used with RSSI values to predict proximity in wireless systems.

"Undiscoverable device" means a device that is not discoverable as defined by the Bluetooth™ specifications (but may still communicate with devices with which it has previously communicated.)

Both "pairing" and "authentication" are core Bluetooth™ operations. These are universal in all Bluetooth™ capable devices.

An exemplary embodiment of the invention will now be described in detail with reference to the Figures of the accompanying drawings pages.

DETAILED DESCRIPTION

Figure 1:
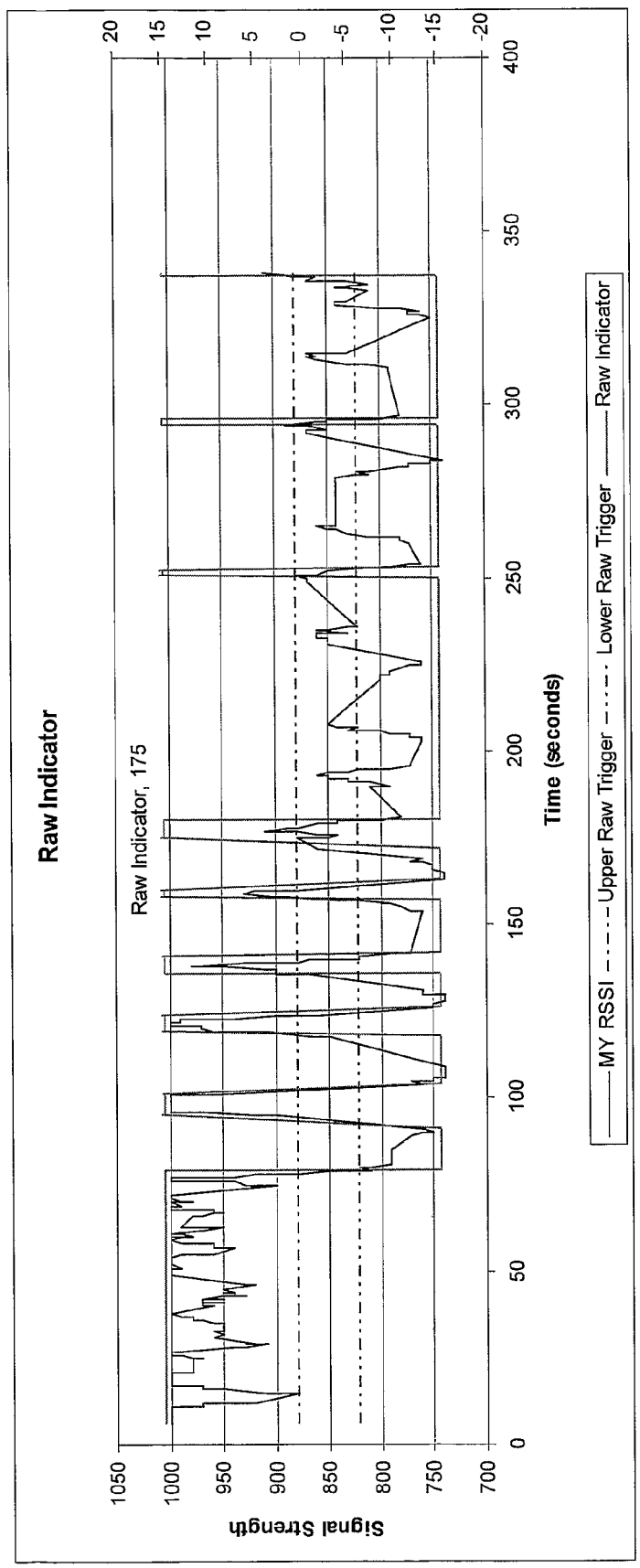
FIG. 1—Graph presenting signal strength (raw data) versus time.
Figure 2:
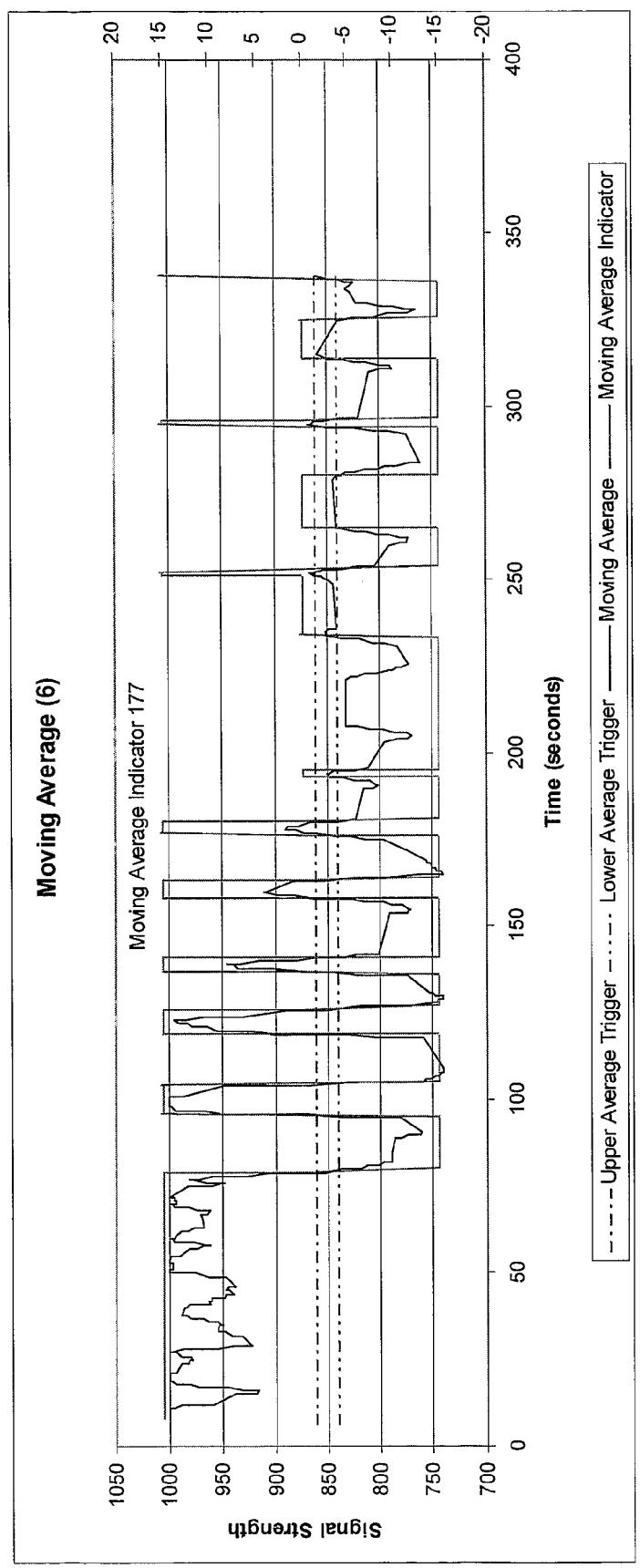
FIG. 2—Graph presenting moving average of signal strength versus time.
Figure 3:
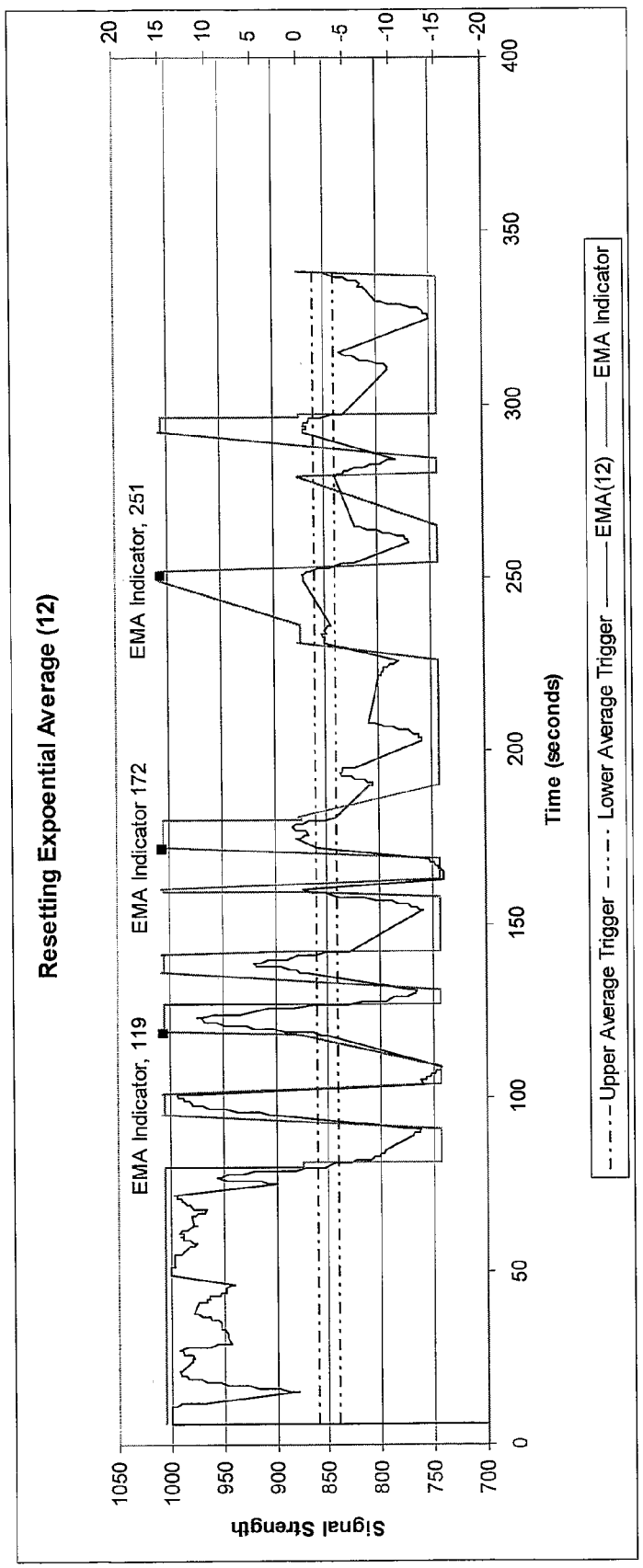
FIG. 3—Graph presenting resetting exponential average of signal strength versus time.
Figure 4:
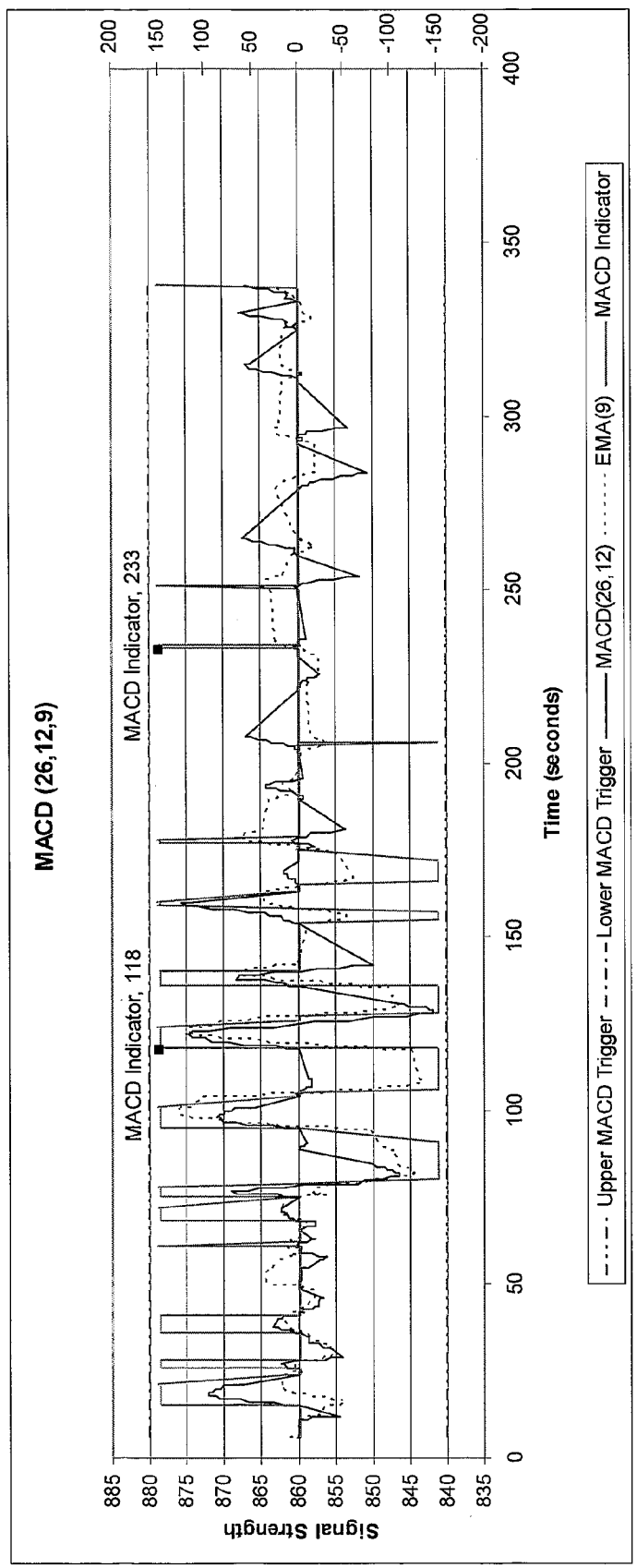
FIG. 4—Graph presenting MACD (26, 12, 9) of signal strength versus time.
Figure 5:
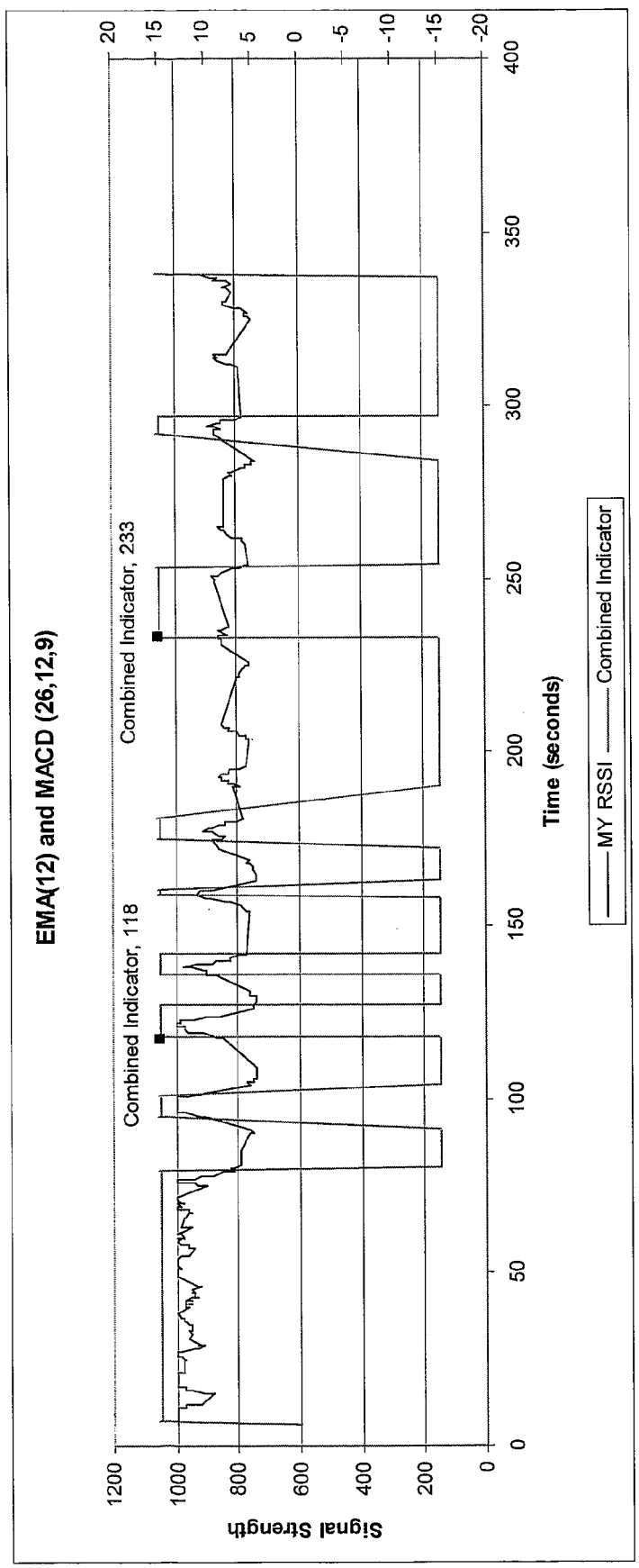
FIG. 5—Graph presenting EMA (12) and MACD (26, 12, 9) of signal strength versus time.

Technical indicators used in the financial markets are applied to RSSI values to determine the proximity and movement of radio frequency devices relative to one another. Analysis of the RSSI values over time can be used to determine whether the distance between the devices in increasing or decreasing, i.e. whether one of the devices is moving toward or away from the other device.

When dealing with moving objects and changing environments, proximity is not only related to signal strength, but also the changes in signal strength over time or the signal strength velocity and acceleration. The variations over time can be used to determine direction of movement which when combined with distance provides a more accurate indicator of proximity.

One advantage of the invention is that it allows the relative proximity and movement of two or more radio frequency devices to be determined. The use of the technical indicators, and particularly the exponential moving average and the moving average convergence divergence, allows the underlying trends in movement to be accurately and rapidly determined with a high degree of sensitivity without being affected by false indications caused by environmental fluctuations.

In radio frequency environments the signal strength can be influenced by the physical surrounding. An object moving through the line of sight between the transmitting and receiving devices can have an impact on signal strength. Even a change in the signal reflection from surrounding objects can affect it. The challenge is to identify the underlying trends that relate to distance rather than these environmental fluctuations. This can be achieved through the use of technical indicators.

Although one of the advantages of the invention is that it may be employed in conjunction with known radio frequency devices, the manufacture of radio frequency devices specifically to use the invention is contemplated. In particular, the manufacture of radio frequency devices consisting or either (as opposed to both) a transmitting or receiving device is contemplated.

Technical Indicators
Schmitt Trigger

By creating a buffer zone between the "in" and "out" of proximity boundaries the fluctuations of signal strength can be ignored. This is the basis of a Schmitt Trigger. Signal strength below a minimum are considered out of proximity, signal strength above a maximum are consider within proximity and signal strength between the minimum and maximum are left unchanged in their previous state. In order to be effective the size of the buffer zone must be larger than the size of the environmental fluctuations that are to be ignored.

This is a simple approach. However if the fluctuations are of a significant size, the size of the required buffer will create a delay in detecting objects. If the objects are moving, this delay will create significant variations in distance.

Moving Averages

By averaging over a history of readings the size of the fluctuations can be reduced and therefore the size of the buffer zone required in the Schmitt Trigger becomes smaller. The fluctuations can be reduced by increasing the number of periods that signal strength is averaged over, however this also increases dependence on historical values and increases the delay when responding to trends. This approach however requires a history of readings to be maintained and for mobile devices the ability to store this information is often limited.

It would be advantageous if there was an accurate means for determining the proximity of moving transmitting and receiving devices on the basis of signal strength independent of random environmental induced fluctuations of signal strength with a minimum of processing and storage requirements. The system must also be able to handle discontinuities of lost signals.

Financial Technical Analysis

A large amount of mathematical research has gone into identifying underlining trends in fluctuating values in stock markets and is covered by the broad area of financial technical analysis. By applying the principals of financial technical analysis to fluctuating signal strength values we can improve the identification of underlying trends and therefore improve the interpretation of signal strength as a measure of distance.

The challenge is to analyse the fluctuating data and thereby to identify trends and make predictions. By applying the analysis tools of financial technical analysis it is possible to identify the trends of signal strength and in doing so measure proximity of the devices.

Leading Indicators

Leading indicators are designed to lead fluctuations. Most represent a form of momentum (or sustained velocity) over a fixed look-back period. The fixed look-back period is the number of periods used to calculate the indicator. Some of the more popular leading indicators include Commodity Channel Index (CCI), Momentum, Relative Strength Index (RSI), Stochastic Oscillator and Williams % R.

Even though many principles of technical analysis are universal, each signal set up has its own idiosyncrasies.

Momentum Oscillators

Many leading indicators come in the form of momentum oscillators. Momentum measures the rate-of-change of the fluctuating value. As the value rises, the momentum increases. The faster the values rise (the greater the period-over-period change), the larger the increase in momentum. Once this rise begins to slow, momentum will also slow. As the growth in value reduces, momentum starts to actually decline from previous high levels.

Lagging Indicators

As their name implies, lagging indicators follow the fluctuations and are commonly referred to as trend-following indicators. Rarely, if ever, will these indicators lead the fluctuation. Trend-following indicators work best when values develop strong trends. They are designed to identify a trend and maintain it as long as the trend is intact. Some popular trend-following indicators include moving averages (exponential, simple, weighted, variable) and moving average convergence/divergence (MACD).

The invention will now be illustrated with reference to the following example in which financial technical momentum indicators are applied to measurement of Bluetooth signal strength from a mobile phone from inside a stationery vehicle. In this embodiment of the invention the aim is to provide a proximity detection of the phone coming within 2 meters of the vehicle in any manner and from any direction.

The signal is affected by the different objects in the line of sight between the transmitter and receiver and financial technical analysis techniques where used to identify the underlying trends to remove these fluctuations.

EXAMPLE

Application of Technical Indicators to RSSI Values

For illustration of this approach the movement of the transmitting device is represented in the graphs of FIGS. 1 to 5 (with the raw data appended to the description)

| Time Range (seconds) | Description |
|---|---|
| 0-80 | Moving around within proximity |
| 80-180 | Moving into and out of range approximately every 15-20 seconds |
| 180-340 | Moving into edge of range approximately every 60 seconds |

With this one set of data five different formulae will be used to determine proximity, each one with an appropriately tuned Schmitt trigger to produce the same general level of detection. It will become clear that while they will all detect the same general behaviour of moving in and out of proximity, the use of financial technical indicators will improve the responsiveness of detection without increasing the false positives.

In this case the relative signal strength has a maximum of 1000 and a minimum detectable strength of approximately 740. This range has been used to achieve three significant figures of accuracy while using integers. In each case, the solid line represents the indicator under consideration, dash-dot represents the upper trigger point, dash-dot-dot represents the lower trigger point, and dashed line represents the proximity detection. The scale for proximity detection is positive is within proximity, negative is out of proximity and zero is within the hystersis of the Schmitt Trigger.

The five indicators considered are
1. Raw Values (refer FIG. 1)
2. Moving Average (6) Indicator (refer FIG. 2)
3. Resetting Exponential Moving Average (12) Indicator (refer FIG. 3)
4. Moving Average Convergence Divergence (26, 12, 9) Indicator (refer FIG. 4)
5. Combined Indicator (refer FIG. 5)

Raw Values

Raw values of signal strength were used with a Schmitt trigger of (880, 820) to create an indicator. Any reduction in the size of the buffer zone would produce a significant number of false positives.

Moving Average

In this case a moving average of 6 previous values with a Schmitt trigger of (860,840) was used. The moving average is calculated as follows.

Moving Average $(n)$=Sum(Previous $n$ values)/$n$

The same general behaviour produced for the Raw Indicator can be reproduced with a smaller trigger range. However, the cost of this is an increased time lag. With the moving average proximity is detected at 177 seconds, rather than the 175 seconds detected by the raw indicator.

Exponential Moving Average (EMA)

In order to reduce the time lag in simple moving averages, we can use exponential moving averages (also called exponentially weighted moving averages or EMAs). EMAs reduce the lag by applying more weight to recent values relative to older values. The weighting applied to the most recent value depends on the specified period of the EMA. The shorter the EMA period, the more weight that will be applied to the most recent value. As such, EMAs will react quicker to recent changes than a simple moving average. The calculation formula is as follows.

EMA(current)=((Price(current)−EMA(prev))×Multiplier($N$))+EMA(prev)

Where

Multiplier ($N$ periods)=2/(1+$N$ periods)

EMAs also have the advantage that they can be calculated from one current and one history value reading. Unlike the simple moving average there is no need to store N previous values.

In signal strength, a value reading is not always available. Unlike stock prices, when the signal strength is so low to be beyond detection there will be no values available. EMAs are cumulative and include a contribution (at ever decreasing weighting) of all the historical values. A discontinuity in the values disrupts averaging. For this reason, we have a used a resetting EMA where the average is returned to the raw value if the signal strength reading is lost. In location based terms, this equates to losing the position of the transmitting device, and making no assumptions on its current movement from it's last known position.

In this case, a resetting EMA of over a range of 12 was used with a Schmitt trigger of (860,840).

Again the general detection of proximity was the same as before however there is a the significant improvement in sensitivity triggering at 172 seconds rather than 175 and 177 for the raw and moving average indicators, respectively, without any false positives.

Moving Average Convergence Divergence (MACD)

There are a number of leading momentum formulae that could have been used such as Commodity Channel Index (CCI), Rate of Change, Relative Strength Index (RSI), Stochastic Oscillator and Williams % R. We selected MACD due to its ability to be calculated without the need to maintain a history of values and ability to handle discontinuities of lost signals.

The most popular formula for the "standard" MACD is the difference between a 26-period and 12 period exponential moving averages. These values can be altered to come up with a MACD that is better suited for faster or slower signal strengths. Using shorter moving averages will produce a quicker, more responsive indicator, while using longer moving averages will produce a slower indicator, less prone to whipsaws. For our purposes in this discussion 12/26 MACD will be used for explanations.

Of the two moving averages that make up MACD, the 12-day EMA is the faster and the 26-day EMA is the slower.

MACD$(i,j)$=EMA$(j)$−EMA$(i)$

In stock analysis, closing prices are used to form the moving averages. For signal strength, each value is equally important so every value is used right back to the previous discontinuity of a lost signal. A 9-day EMA of MACD is plotted along side to act as a trigger line. This creates an acceleration rather than velocity measure (see below). For stock analysis the goal is to identify the changes of increasing and decreasing signals. In proximity measure the goal is to include the velocity of transmitting device. If the transmitting device has a velocity towards the receiving device, the signal strength will be increasing, the fast 12 period EMA will respond quicker than the slower 26 period EMA and MACD will be positive. Conversely a negative MACD indicates the transmitting device is moving away.

The relative movement of the objects can be used to create a proximity trigger. If the transmitting device is near (but not in range) and it is moving towards the receiver then it can be considered to have already moved into the required proximity. In mathematical terms this becomes: if the MACD is positive and fast resetting EMA is close to the upper Schmitt Trigger then the device is within range. In this case we used a MACD trigger value of +1 (moving slightly towards) and just out of range EMA (12) signal of 840. The out of proximity range used the smoothed EMA (9) of MACD value of −30 (definitely moving away) and just in range EMA (12) value of 880.

There are two key points on this graph (FIG. 4) that demonstrate the early detection of a object moving into range. The first is at 118 seconds and the second at 233 seconds. This corresponds to the values of 119 and 251 from using EMA indicator alone. However the situation of moving slowly into range at 293 seconds was not detected. MACD is a measure of velocity and in this case the velocity was not high enough to create a positive MACD.

Combined Indicator

By combining the velocity sensitive MACD indicator and the distance sensitive EMA indicator we get the benefits of both approaches resulting in the optimal indicator.

These have been combined by using the proximity triggers from MACD (26,12,9) and if there are no triggers then use the triggers from EMA (12). This particular embodiment relates to the signal strength of Bluetooth receiver inside a car and external Bluetooth transmitting device. The parameters used in this example equate to a proximity range of 2 meters range outside the car.

When these indicators are combined there are 6 trigger points as defined below.

| Trigger Name | Example values | Description |
|---|---|---|
| RSSI_in_range_towards | 840 | The RSSI trigger that indicates in range trigger when combined with MACD triggers. |
| RSSI_out_of_range_away | 880 | The RSSI trigger that indicates out of range trigger when combined with MACD triggers. |
| MACD_towards | +1 | MACD trigger that indicators moving towards. |
| MACD_away | −30 | MACD trigger that indicators moving away. |
| RSSI_in_range | 890 | The RSSI trigger that indicates in range. |
| RSSI_out_of_range | 840 | The RSSI trigger that indicates out of range. |

Trigger Rules

When these triggers are combined they can be used in the following rules to measure proximity.

| Situation | Criteria | Result |
|---|---|---|
| 1. Strongly towards and near | MACD(26, 12) >= MACD_towards and RAW_RSSI >= RSSI_in_range_towards and EMA(12) >= RSSI_out_of_range (to avoid whip saw to Situation 5) | Device In Range |
| 2. Strongly away and distant | MACD(26, 12) < MACD_away and EMA(26) < RSSI_out_of_range_away and EMA(12) < RSSI_in_range (to avoid whip saw to Situation 3) | Device Out of Range. |
| 3. In range | EMA(12) >= RSSI_in_range | Device In Range |
| 4. Within the buffer zone | EMA(12) < RSSI_in_range and EMA(12) >= RSSI_out_of_range | Device In Buffer. |
| 5. Just out | EMA(12) < RSSI_out_of_range | Device Out of Range. |

Trigger Conditions

In order to prevent whipsaws the triggers must obey the following conditions.

| Condition | Reason |
|---|---|
| RSSI_in_range > RSSI_out_of_range > RSSI_disconnect | To cover the full range of possible RSSI values. |
| RSSI_in_range_towards >= RSSI_out_of_range | To prevent fluctuations in MACD values with the same RSSI value moving between Situation 1 and 5 |
| RSSI_out_of_range_away < RSSI_in_range | To prevent fluctuations in MACD moving between case 2 and 3 |
| RSSI_in_range_towards <= RSSI_in_range | To enable the moving towards trend to open earlier that by considering RSSI alone. |
| RSSI_out_of_range_away >= RSSI_out_of_range | To enable the moving away trend to close earlier that by considering RSSI alone. |
| RSSI_in_range_towards <= RSSI_out_of_range_away | This is a recommendation rather than a condition. |

Other Indicators

There are a number of other formula, thresholds and techniques that can also be used to further improve the sensitivity of proximity detection from signal strength.

Quality of Signal

A reduced signal quality can be an indicator of an obstruction which can reduce the measured signal strength while the distance is unchanged. By measuring both RSSI and Signal Quality, a more accurate representation of proximity can be achieved by increasing the measured signal strength in proportion to the reduced signal quality.

Period of Averaging

The period at which the EMA are calculated can be adjusted to the volatility of the signal strength received. The lower the number of periods and the more sensitive the detection will be. The challenge is to avoid the false positives.

Trigger Values

Level of trigger thresholds are dependent on the proximity required and the relative values of RSSI obtained. The size of the buffer zone will also affect the sensitivity of detection. These all have to be tuned for the specific implementation.

In addition to MACD there are number of other velocity measures that are also situation for this type of proximity measurement.

Rate of Change (ROC)

$$\text{ROC} = (\text{Current RSSI} - \text{RSSI } n \text{ periods ago})/(\text{RSSI } n \text{ periods ago})$$

This indicator is similar to MACD but requires a history of values to be maintained and can not handle discontinuities of lost signals and is therefore not as useful as MACD.

Relative Strength Index (n Periods)

$$\text{Average Gain} = \text{Sum(gains over } n \text{ periods)}/n$$

$$\text{Average Loss} = \text{Sum(losses over } n \text{ periods)}/n$$

$$\text{RS} = (\text{Previous Average Gain}*(n-1) + \text{Current Average Gain}))/(\text{Previous Average Loss}*(n-1) + \text{Current Average Loss}))$$

$$\text{RSI} = 100 - 100/(1+\text{RS})$$

(Developed by J. Welles Wilder in 1978) this is useful for detecting over bought and over sold signals however these do not translate to proximity measures.

Stochastic Oscillator

Developed by George C. Lane in the late 1950s, the Stochastic Oscillator is a momentum indicator that shows the location of the current close relative to the high/low range over a set number of periods. Closing levels that are consistently near the top of the range indicate accumulation (buying pressure) and those near the bottom of the range indicate distribution (selling pressure).

$$\% K = 100 * (\text{Recent Close} - \text{Lowest Close over } n \text{ periods})/(\text{Highest High over } n \text{ periods} - \text{Lowest Low over } n \text{ periods})$$

When % K is greater than a threshold such 80% the latest value of the signal strength is close to the maximum including the signal strength is close to its maximum over recent times and if nearby this can indicate proximity.

This indicator is similar to ROC and MACD but requires a history of values to be maintained and is therefore not as useful as MACD.

Williams % R

Developed by Larry Williams, Williams % R is a momentum indicator that works much like the Stochastic Oscillator.

$$\% R = 100 * (\text{Highest over } n \text{ periods} - \text{Recent close})/(\text{Highest High over } n \text{ periods} - \text{Lowest Low over } n \text{ periods})$$

This indicator is similar to ROC and MACD but requires a history of values to be maintained and is therefore not as useful as MACD.

Commodity Channel Index (CCI)

Developed by Donald Lambert, the Commodity Channel Index (CCI) was designed to identify cyclical turns in commodities. The assumption behind the indicator is that commodities (or stocks or bonds) move in cycles, with highs and lows coming at periodic intervals.

There are 4 steps involved in the calculation of the CCI:

Calculate the last period's Typical Strength (TS)=(H+L+M)/3 where H=high, L=low, and M=median.

Calculate the n-period Simple Moving Average of the Typical Strength (SMATS).

Calculate the Mean Deviation. First, calculate the absolute value of the difference between the last period's SMATS and the typical strength price for each of the past n periods. Add all of these absolute values together and divide by n to find the Mean Deviation.

The final step is to apply the Typical Strength (TS), the Simple Moving Average of the Typical Strength (SMATS), the Mean Deviation and a Constant (0.015) to the following formula:

$$CCI = (\text{Typical Strength} - \text{SMATS})/(0.015 * \text{Mean Deviation})$$

This may be applicable if the transmitter and receiver have a cyclically proximity, but in a random situation this will not help.

Acceleration Measures

Acceleration measure or a change in velocity can be calculated by the difference between the current velocity and the (exponential) moving average of the velocity. This can be applied to MACD, Stochastic Oscillators and Williams % R. Using acceleration indicators introduces leading characteristics into these lagging momentum indicators. This can be used to further improve the sensitivity of the indicators described above and therefore increasing accuracy.

| Value | Indication |
|---|---|
| Positive | Accelerating towards |
| Zero | Constant Velocity |
| Negative | Accelerating away |

Combination of Indicators

With increasing sensitivity there is a risk of increasing false positives for proximity. By using a combination of individual indicators described above, the increased sensitivity can be managed by requiring multiple confirmations from multiple indicators.

Application to Control of Switches

Figure 6:
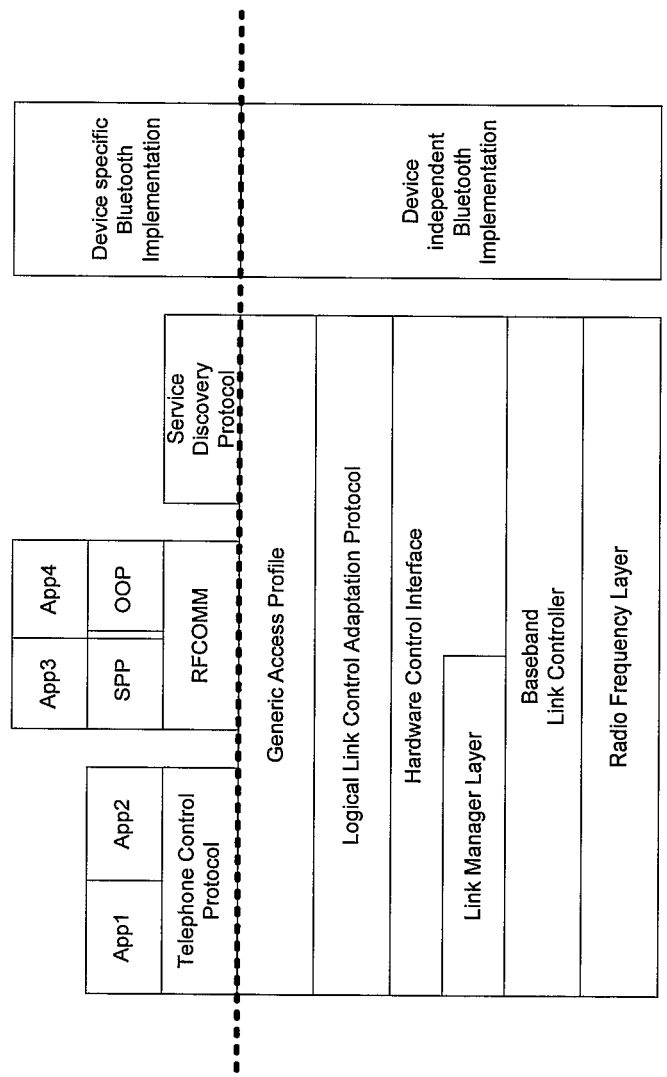
FIG. 6—Schematic representation of the architecture of the existing radio frequency technology Bluetooth™.

FIG. 6 displays standard Bluetooth™ architecture. This can be divided into two main levels as shown in FIG. 6 by the dotted lines.

The information contained below the dotted line represents generic Bluetooth™ architecture which is core to Bluetooth™ functionality. These events will occur regardless of the particular Bluetooth™ device being used.

This action above the line represent specific profiles and implementations. These are device specific. That is, two devices must be compatible or have compatible software or profiles loaded on each of them to allow communication between two devices. In general, profiles are specific to a manufacture or device provider.

The present invention utilises the core Bluetooth™ functionality. In this way compatibility issues can be avoided. The Bluetooth™ remote device is paired with the Bluetooth™ processor in the switch controller. In this way, a trusted relationship is formed with the devices.

In subsequent contacts, the Bluetooth™ switch controller will initiate an authentication with the remote Bluetooth™ device. In the traditional Bluetooth™ context this authentication request represents a prelude to establishing a full connection between two or more Bluetooth™ devices.

In the present invention a full connection does not need to be formed. Instead, the receipt of an authentication request by the switch controller triggers operation of the switch.

By utilising the authentication request in this manner the requirements for establishing a connection and complication arising from the need to have equivalent or compatible Bluetooth™ versions and profiles on each of the device and the processor are avoided.

The clock offset and page scan mode are maintained for each Bluetooth™ remote device to improve the speed of the pairing requests. Bluetooth™ range indicators such as RSSI values and Link Quality can be obtained during the pairing process and can be used to refine the range.

By keeping the Access Control Lists open after successful Authentication RSSI values can continue to be read until they are timed out. Once the Access Control Lists are closed these indicators are lost unless a profile specific connection is established.

Repeating the Authentication process enables RSSI values to re-read and used to determine proximity of the devices. Once pairing is completed (successfully or otherwise) these indicators are lost unless a profile specific connection is established.

Figure 7:
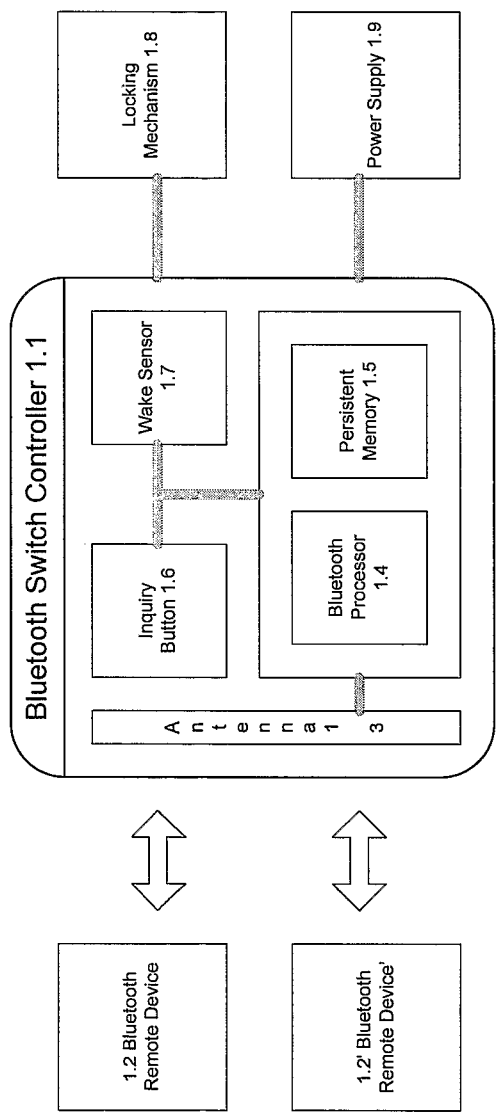
FIG. 7—Schematic representation of switch control utilising the radio frequency technology Bluetooth™ proximity reader of the invention.

FIG. 7 describes the switch controller set up in the a preferred embodiment of a single lock configuration. The switch controller (1.1) includes an antenna (1.3) together with a Bluetooth™ processor (1.4). The antenna may require an external low noise amplifier for increased sensitivity. The controller additionally includes some persistent memory (1.5).

The controller (1.1) is connected to a switch mechanism (1.8) and a power supply (1.9). The switch controller (1.1) sends regular authentication requests to its known trusted devices stored in persistent memory (1.5).

When a Bluetooth™ remote device (1.2) comes into range of the antenna (1.3) it responds to the authentication request and validates its location and authenticity. This occurs whether the remote device is discoverable or not. The receipt of this request is processed by the processor (1.4) and the switch mechanism is triggered.

In the preferred embodiment the switch controller may also include an inquiry button (1.6) and an awake sensor (1.7). The inquiry button is used to initiate the pairing process between the Bluetooth™ processor (1.4) in the controller (1.1) and Bluetooth™ remote device (1.2).

On pressing the button the Bluetooth™ processor within the controller (1.1) will send an inquiry to any discoverable Bluetooth™ remote device (1.2) that is in range. The Bluetooth™ remote device (1.2) responds and the pairing process is initiated.

The pairing process will be well known to those familiar with Bluetooth™ technology. Once pairing is complete the processor (1.4) and the Bluetooth™ device (1.2) will enjoy a trusted relationship. After that, the sending of an authentication response by the Bluetooth™ remote device to an authentication request from the Bluetooth™ processor with an appropriate RSSI value indicating proximity will be sufficient to trigger the switch unlock response. Continuous or extended readings of RSSI values can be obtained by maintain the Access Control List open and repeating the authentication.

The inquiry button is preferably located within a secured location. There must be some mechanism for allowing the initial inquiry between the Bluetooth™ processor in the switch controller and the Bluetooth™ remote device. If there is no such mechanism, there will be no pairing and hence no authentication request can be generated.

In addition, the switch controller may feature an awake sensor. The awake sensor is a mechanism to conserve battery-life within the switch controller or minimise power usage. It is envisaged that the awake sensor will change the switch controller from a sleep mode to an awake mode. The non-authenticating awake sensor can comprise any mechanism which is triggered by the proximity of a vehicle or person to the device. In addition it may be linked to a clock on a timer mechanism. Examples of possible awake sensors include motion detectors and vibration detectors.

More than one Bluetooth™ remote device may be paired with the Bluetooth™ processor. Subsequent pairings can be mediated by use of the inquiry button. The pairing details are stored in the persistent memory in the controller and are accessible on demand.

The inquiry button can also be used as the basis of administration for the Bluetooth™ processor for altering pairing information and configuration values. Additional external wired (Ethernet, RS232) and wireless connection (NFC, Zig-Bee, GSM, GPRS, Radio Frequency, WiFi) can also be used to administer the system remotely.

In a preferred embodiment at least one of the Bluetooth™ remote devices will be an administrator device or have administrator privileges. For the administrator device it will be necessary to support one of the standard Bluetooth™ profiles on the device.

The administrator device will need to form an authenticated and encrypted profile connection to exchange information with the Bluetooth™ processor to change the details in the persistent memory. For example, the addition or deletion of Bluetooth™ devices from the approved pairing list or change the PIN.

In particular, the PIN may be changed using any device that supports the business card exchange profile or Object Push Profile (OOP). The switch controller will be moved into inquiry mode which will also enable the OPP and PAN profiles with Bluetooth encryption.

The remote device can send a business card via the OPP profile to the switch controller where is the old PIN as the first name and new PIN as the second name. On receiving this business card the switch controller will stop inquiring, check the old PIN and if it matches, all authenticated devices will be removed from the stored memory and PIN changed. Once this is complete the switch controller will inquiry for devices in range and request authentication to store them in the persistent store again.

The full range of administration functions including creating temporary PIN, changing PIN, manual intervention (see below) deleting individual remote devices, changing transmission power, returning to factory settings, as well parameters changing the interface to the locking and unlocking mechanism can be administrated from a remote device that supports the personal area networking (PAN) profile. This is typically a computer or personal digital assistant.

In the same way as for the basic administration with the OPP profile an encrypted PAN connection can be established with the switch controller. The remote device can then access dynamic WML/HTML pages served by the switch controller to administer the functions of the switch controller. These dynamic WML/HTML pages can be used to display values from the persistent store as well as post values to the switch controller for updating them.

Figure 8:
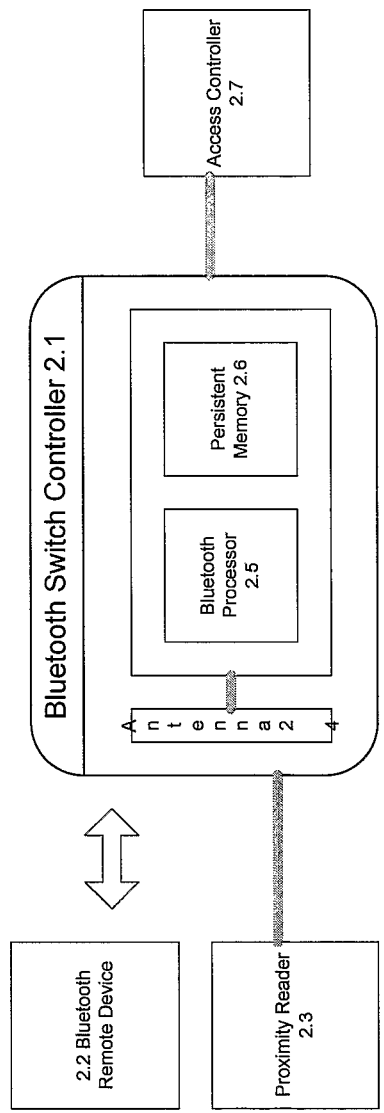
FIG. 8—Schematic representation of access control system utilising the radio frequency technology Bluetooth™ proximity reader of the invention.

FIG. 8 displays an alternative to the system envisaged in FIG. 7. The access control is centralised. This is very similar to the centralised security systems we see today in various buildings. The actual controller includes an antenna (2.4), a Bluetooth™ processor (2.5) and persistent memory (2.6). It is similar to the unit described in FIG. 7. However, a centralised access controller holds the information as to who is able to access the specific premises or areas.

Specifically, a Bluetooth™ switch controller is connected in between a traditional passive proximity reader and the access controller. The authorisation request is intercepted by the Bluetooth™ switch controller when it is sent from the proximity reader to the access controller.

At that point the Bluetooth™ switch controller inquires for any discoverable Bluetooth remote devices that are in range. If they are the switch controller authenticates with the remote device and stores the remote device Bluetooth™ address, link key and proximity authorisation request.

When switch controller returns the repeated authorisation mode, and whenever an authenticated remote device is in range, the associated authorisation request is sent to the access controller as if the proximity reader had done it itself.

Once a remote device has been authenticated by the switch controller, it requests a connection of a specific profile such as serial port profile, headset profile etc. Most (but not all) Bluetooth™ devices support one of these profiles and can alert if another device tries to connect. This is request to connect is accepted by the remote device, the switch controller is notified and able to undertake a manually initiated process, such as open a gate.

After a defined number of authentications the pairing could be removed requiring the user to undergo the PIN entry and authentication process with the card again. The PIN could be associated with the card number to avoid having to distribute the PIN.

It is envisaged that the Bluetooth™ switch controllers of the present invention could replace the existing card readers used in many buildings at present. As a transition strategy, it is envisaged the two systems will work in an integrated way. When the card reader is used for the first time after installation of the Bluetooth™ switch controller, it will trigger an inquiry from the switch controller. This will lead to a pairing between the controller and the remote device carried by the user.

By adding a Bluetooth™ switch controller in between the proximity reader and the access control system an association between a Bluetooth™ remote device and authorisation request can be stored. There are no changes required to central access control system, either in terms of software or hardware and only the installation of a Bluetooth™ switch controller with each proximity reader.

The management of the access rights is the unchanged and registration of the remote device is undertaken by the user without the need for central building management to be involved which is important for shared offices. This provides dual support for both technologies. The distribution of the PIN is not an issue as the user requires the security card as well.

The access control credential information linked to the card that triggered the inquiry can thus be linked to the concomitant pair formation. When an authenticated Bluetooth™ remote device is in range the associated access control credential information is sent to the security system for authorisation. The access control credential information may also be the link key of the Bluetooth™ pairing.

Those skilled in the art will appreciate that the invention is useable in a wide range of applications. Without wishing to limit the possible uses of the invention, examples of where the core invention may be used include home automation systems, access control systems, gates, garages, vehicles, electronic consumer devices, security and alarm systems.

The invention is advantageous as it allows a single Bluetooth™ remote device to be used to operate a plurality of switches in a secure way. In addition, each controller can recognise a number of remote devices.

The use of core Bluetooth™ functionality enables the invention to be used with a broad range of Bluetooth™ capable devices and avoids the incompatibility issues suffered by predecessor devices.

In addition, the process is automatic, in that, the switch will be triggered when the remote device comes within a certain distance of the controller. This allows for hands free operation.

The analysis of RSSI values can be combined with the use of Bluetooth™ devices as described above to determine their proximity to each other. In addition the Bluetooth™ pairing protocol can advantageously be used to increase security.

The use of raw RSSI values and moving averages within Schmitt riggers to detect proximity based on RSSI values leads either to false positives or slower response time. The use of the EMA and MACD of RSSI values within Schmitt triggers enables more accurate determination of the proximity of the transmitting device relative to the receiving device.

The indicators allow determination of whether the devices are coming closer together or moving further apart. The inclusion of a rate of change or acceleration analysis allows account to be taken of how quickly the proximity of the devices is changing.

Further reduction in failed triggers can be achieved by the inclusion of feedback mechanisms. For example negative feedback associated with unlocking a door would be a door not being opened. This can be used to dynamically tune the trigger values to minimise the occurrence of false triggers.

This combination leads to significantly quicker response times in terms of operating the switch. In addition, the incidence of false positives, or the triggering of the switch due to the change of signal propagation rather than proximity, can be decreased.

General Process Implementation

Figure 9:
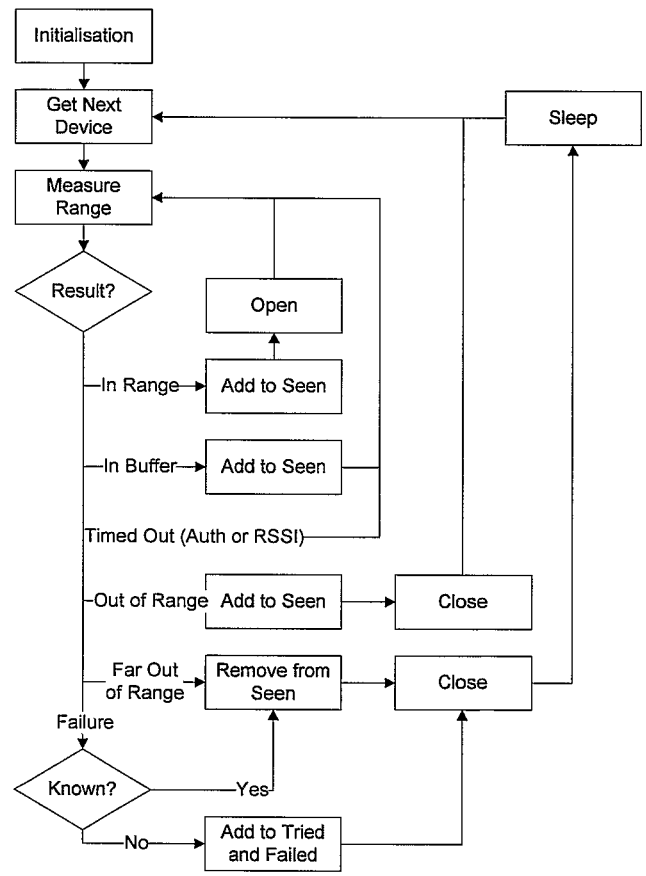
FIG. 9—Representation of the process flow for an implementation of the method in a Bluetooth™ environment.
Figure 10:
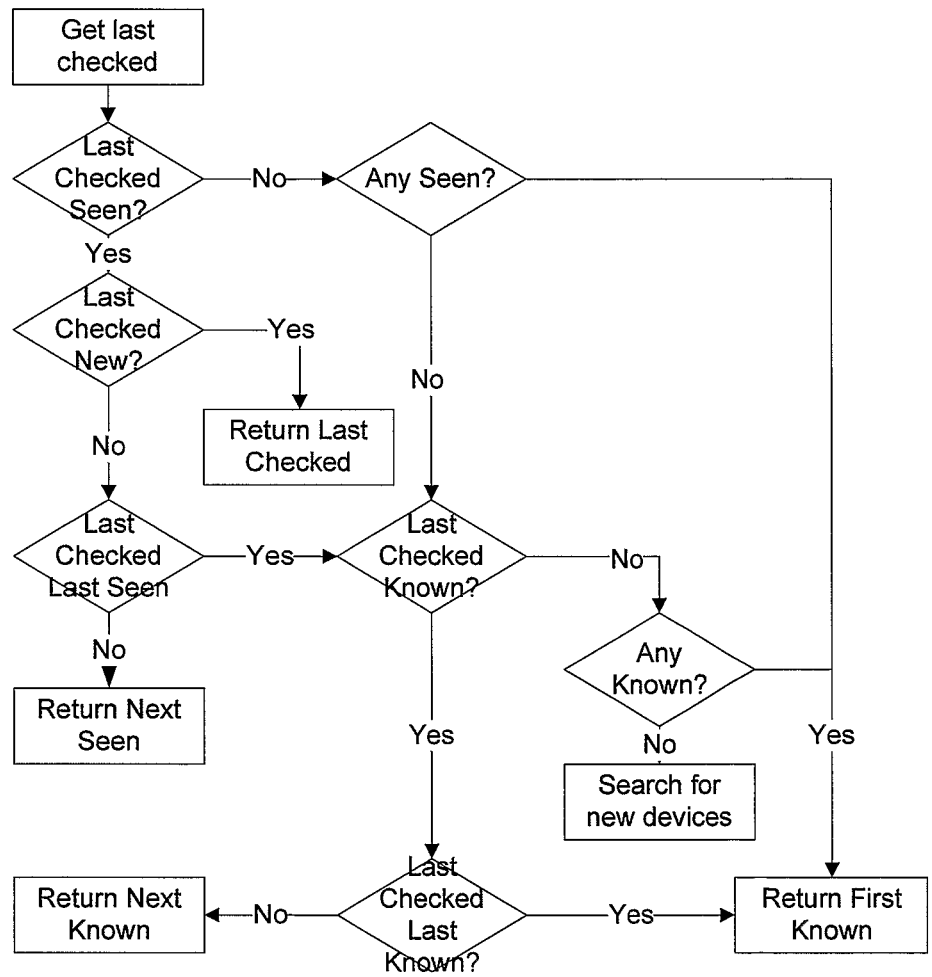
FIG. 10—Representation of the process of getting the next device for measurement.

Referring to FIG. 9 the process flow for an implementation of the method in a Bluetooth™ environment is provided. The following table indicates the statuses of transmitting devices. Referring to FIG. 10 the process of getting the next device for measurement is described.

| Status | Description | Usual Action |
|---|---|---|
| Tried and failed | We have tried to authenticate this device and it has been unsuccessful. This may be due to incorrect PIN or it moved out of range. This device will be ignored unless an Inquiry is restarted. | Ignore this device. Reset the list of Tried and Failed devices every time a user reinitiates an Inquiry. |
| New | The device has been found and it is not in Known nor has it failed authentication during Inquiry. | Authenticate device and measure range. |
| Known | This device has authenticated in the past and is stored in memory but it is not currently Seen. | Measure range. |
| Seen | This is a Known device has been seen and its range measured. | Measure range |

Example of Implementation for a Garage

Referring to FIG. 7 the following table highlights the implementation for a garage unit followed by a summary of the steps of operation.

| Component Reference | Implementation |
|---|---|
| 1.1 | This is a 4 layer printed circuit board with surface mount components. |
| 1.2 | Bluetooth capable cell phones, headsets or hands free car kits. |
| 1.3 | 2 dBm antenna with 24 dBm Low Noise Amplifier for increased sensitivity and therefore range. |
| 1.4 | Cambridge Silicon Radio Bluecore 04 Ext BGA chip. |
| 1.5 | 8 MBit Flash memory |
| 1.6 | Radio frequency module to record wireless wall station button or wired wall station button to close once arrived or open when leaving. |
| 1.7 | None required as mains powered. |
| 1.8 | Relay that provides a toggle message to the garage door controller. |
| 1.9 | AC/DC converter from either 110 Volts or 240 Volts to 3.3 Volts. |

1) Register transmitting device with receiving device.
2) Press the wall unit button to open garage door to leave.
3) Record that the in range device is leaving.
4) Close the garage door when the in range device is out of range.
5) Open the garage door when the in range device is within range.
6) Press the wall unit button to close the garage once arrived.
7) Record that the in range device is at home and no longer requires monitoring.

Example of Implementation for a Car

Referring to FIG. 7 the following table highlights the implementation for a car unit followed by a summary of the steps of operation.

| Component Reference | Use in car implementation |
| --- | --- |
| 1.1 | This is a 4 layer printed circuit board with surface mount components. |
| 1.2 | Bluetooth capable cell phones, headsets or hands free car kits. |
| 1.3 | 2 dBm antenna with 24 dBm Low Noise Amplifier for increased sensitivity and therefore range. |
| 1.4 | Cambridge Silicon Radio BlueCore 04 Ext BGA chip. |
| 1.5 | 8 MBit Flash memory |
| 1.6 | This inquiry button is a combination of a physical button on the dash, and switches connected to the door and ignition. |
| 1.7 | This is a combination of the switches connected door and ignition. For example sleep when the ignition is on and wake when the ignition is off. |
| 1.8 | This powers for example the central door locking, window closing, flashing lights, sounding the horn, arming and disarming the alarm system. |
| 1.9 | A DC/DC 12 volt to 3.3 Volt converter. |

1) Register transmitting device with receiving device.
2) Unlock the car doors and disarm when a registered device is within range.
3) Avoid any locking once a door is opened.
4) Stop monitoring once the ignition is on.
5) Start monitoring devices once the ignition is off.
6) Avoid any locking until all doors are closed or an.
7) Lock doors and arm once the registered device that was in range moves out of range.

Example of Implementation for a Door

Referring to FIG. 7 the following table highlights the implementation for a door unit followed by a summary of the steps of operation.

| Component Reference | Use in door implementation |
| --- | --- |
| 1.1 | This is a 4 layer printed circuit board with surface mount components. |
| 1.2 | Bluetooth capable cell phones, headsets or hands free car kits. |
| 1.3 | 2 dBm antenna with 24 dBm Low Noise Amplifier for increased sensitivity and therefore range. |
| 1.4 | Cambridge Silicon Radio BlueCore 04 Ext BGA chip. |
| 1.5 | 8 MBit Flash memory |
| 1.6 | This inquiry button is a button for the manual release of the door. |
| 1.7 | This is not required for a mains powered unit. |
| 1.8 | This powers an electronic strike, mortice or magnetic lock configurable either in fail/safe or fail/secure modes. |
| 1.9 | A DC/DC 12 volt to 3.3 Volt converter. |

1) Register transmitting device with receiving device.
2) Unlock the door when a registered device is within range.
3) Lock the door when no registered devices are within range.

Example of Implementation for Access Control

Referring to FIG. 8 the following table highlights the implementation for a access control unit followed by a summary of the steps of two alternative operations.

| Component Reference | Use in access control implementation |
| --- | --- |
| 2.1 | This is a 4 layer printed circuit board with surface mount components. |
| 2.2 | Bluetooth capable cell phones, headsets or hands free car kits. |
| 2.3 | Proximity read with Wiegand interface. |
| 2.4 | 2 dBm antenna with 24 dBm Low Noise Amplifier for increased sensitivity and therefore range. |
| 2.5 | Cambridge Silicon Radio BlueCore 04 Ext BGA chip |
| 2.6 | 8 MBit Flash memory. |
| 2.7 | This is a door controller of a building access control system which communicated. |

1) Register transmitting device with Access control system as virtual proximity card.
2) When the receiving detects a Bluetooth device create a Wiegand message for a virtual proximity card.
3) The receiving devices transmits virtual Wiegand message to access controller.

Or

1) Register transmitting device with Access control system as virtual proximity card.
2) Deploy receiving device with same address as central access control system.
3) When the receiving device detects a transmitting device, it requests the private link key from the Access control system to authenticate the transmitting device.
4) Once the transmitting device is authenticated send authorisation request to building access controller.

Although the invention has been described by way of exemplary embodiments it should be appreciated that variations and modifications may be made with out departing from the scope of the invention. Furthermore where known equivalents exist to specific features, such equivalents are incorporated as if specifically referred to in this specification.

| Raw Data | |
| --- | --- |
| Time | RSSI |
| 6 | 1000 |
| 7 | 1000 |
| 7 | 1000 |
| 7 | 1000 |
| 8 | 1000 |
| 8 | 1000 |
| 8 | 1000 |
| 8 | 1000 |
| 9 | 1000 |
| 9 | 1000 |
| 9 | 1000 |
| 10 | 1000 |
| 10 | 1000 |
| 10 | 1000 |
| 11 | 1000 |
| 11 | 1000 |
| 11 | 970 |
| 12 | 970 |
| 12 | 960 |
| 12 | 930 |
| 12 | 920 |
| 15 | 880 |
| 15 | 910 |
| 15 | 910 |
| 16 | 950 |
| 16 | 960 |
| 16 | 970 |
| 17 | 970 |
| 17 | 990 |
| 17 | 1000 |
| 18 | 1000 |
| 18 | 1000 |
| 18 | 1000 |
| 19 | 1000 |

-continued

| Raw Data | |
|---|---|
| Time | RSSI |
| 19 | 1000 |
| 19 | 1000 |
| 19 | 1000 |
| 20 | 1000 |
| 20 | 1000 |
| 20 | 1000 |
| 21 | 1000 |
| 21 | 990 |
| 21 | 990 |
| 21 | 980 |
| 24 | 980 |
| 24 | 980 |
| 24 | 980 |
| 25 | 980 |
| 25 | 970 |
| 25 | 980 |
| 25 | 980 |
| 26 | 990 |
| 26 | 990 |
| 26 | 1000 |
| 26 | 1000 |
| 27 | 1000 |
| 27 | 1000 |
| 27 | 1000 |
| 27 | 990 |
| 28 | 940 |
| 28 | 940 |
| 28 | 930 |
| 28 | 930 |
| 29 | 910 |
| 29 | 930 |
| 29 | 920 |
| 29 | 920 |
| 31 | 960 |
| 32 | 950 |
| 32 | 950 |
| 32 | 950 |
| 33 | 960 |
| 33 | 960 |
| 33 | 960 |
| 33 | 950 |
| 34 | 950 |
| 34 | 950 |
| 35 | 950 |
| 35 | 950 |
| 35 | 950 |
| 35 | 960 |
| 36 | 970 |
| 36 | 970 |
| 36 | 980 |
| 37 | 980 |
| 37 | 990 |
| 37 | 990 |
| 38 | 1000 |
| 38 | 1000 |
| 40 | 960 |
| 40 | 970 |
| 41 | 970 |
| 41 | 950 |
| 41 | 950 |
| 41 | 970 |
| 42 | 970 |
| 42 | 950 |
| 42 | 970 |
| 43 | 950 |
| 43 | 950 |
| 43 | 930 |
| 43 | 940 |
| 44 | 940 |
| 44 | 940 |
| 44 | 950 |
| 44 | 940 |
| 45 | 950 |
| 45 | 950 |
| 45 | 950 |

-continued

| Raw Data | |
|---|---|
| Time | RSSI |
| 46 | 920 |
| 46 | 930 |
| 46 | 930 |
| 49 | 1000 |
| 49 | 1000 |
| 49 | 1000 |
| 50 | 1000 |
| 50 | 1000 |
| 50 | 1000 |
| 50 | 1000 |
| 51 | 1000 |
| 51 | 1000 |
| 51 | 990 |
| 51 | 990 |
| 52 | 1000 |
| 52 | 1000 |
| 52 | 1000 |
| 53 | 1000 |
| 53 | 1000 |
| 53 | 1000 |
| 54 | 1000 |
| 54 | 1000 |
| 54 | 1000 |
| 54 | 1000 |
| 55 | 990 |
| 55 | 960 |
| 57 | 940 |
| 57 | 960 |
| 58 | 960 |
| 58 | 970 |
| 58 | 980 |
| 58 | 990 |
| 59 | 1000 |
| 59 | 1000 |
| 59 | 1000 |
| 59 | 1000 |
| 60 | 990 |
| 60 | 1000 |
| 60 | 980 |
| 61 | 990 |
| 61 | 1000 |
| 61 | 1000 |
| 62 | 970 |
| 62 | 970 |
| 62 | 970 |
| 63 | 950 |
| 63 | 960 |
| 63 | 990 |
| 66 | 980 |
| 66 | 970 |
| 66 | 970 |
| 67 | 960 |
| 67 | 950 |
| 67 | 960 |
| 68 | 960 |
| 68 | 990 |
| 68 | 990 |
| 68 | 1000 |
| 69 | 1000 |
| 69 | 1000 |
| 69 | 990 |
| 70 | 1000 |
| 70 | 1000 |
| 70 | 980 |
| 70 | 990 |
| 71 | 1000 |
| 71 | 1000 |
| 71 | 1000 |
| 72 | 1000 |
| 72 | 1000 |
| 72 | 1000 |
| 75 | 900 |
| 75 | 930 |
| 75 | 930 |
| 76 | 940 |

-continued

| Raw Data | |
|---|---|
| Time | RSSI |
| 76 | 990 |
| 76 | 1000 |
| 76 | 1000 |
| 77 | 1000 |
| 77 | 960 |
| 77 | 940 |
| 77 | 940 |
| 78 | 920 |
| 78 | 920 |
| 78 | 880 |
| 79 | 850 |
| 79 | 830 |
| 79 | 830 |
| 79 | 810 |
| 80 | 820 |
| 80 | 810 |
| 80 | 810 |
| 81 | 790 |
| 81 | 790 |
| 81 | 790 |
| 82 | 790 |
| 82 | 790 |
| 82 | 790 |
| 82 | 790 |
| 83 | 790 |
| 83 | 790 |
| 83 | 790 |
| 84 | 790 |
| 84 | 790 |
| 84 | 790 |
| 85 | 790 |
| 89 | 770 |
| 89 | 770 |
| 89 | 770 |
| 90 | 760 |
| 90 | 760 |
| 90 | 760 |
| 90 | 750 |
| 91 | 760 |
| 95 | 900 |
| 95 | 920 |
| 95 | 920 |
| 96 | 970 |
| 96 | 990 |
| 96 | 1000 |
| 97 | 1000 |
| 97 | 1000 |
| 97 | 1000 |
| 98 | 1000 |
| 98 | 1000 |
| 98 | 1000 |
| 99 | 1000 |
| 99 | 1000 |
| 99 | 1000 |
| 100 | 1000 |
| 100 | 1000 |
| 100 | 1000 |
| 101 | 1000 |
| 101 | 970 |
| 101 | 960 |
| 104 | 760 |
| 104 | 760 |
| 104 | 760 |
| 105 | 770 |
| 105 | 750 |
| 105 | 750 |
| 106 | 750 |
| 106 | 750 |
| 106 | 740 |
| 107 | 740 |
| 107 | 740 |
| 107 | 740 |
| 108 | 740 |
| 108 | 740 |
| 108 | 740 |

-continued

| Raw Data | |
|---|---|
| Time | RSSI |
| 108 | 740 |
| 109 | 740 |
| 109 | 740 |
| 118 | 850 |
| 118 | 870 |
| 118 | 870 |
| 119 | 910 |
| 119 | 950 |
| 119 | 960 |
| 120 | 970 |
| 120 | 970 |
| 120 | 970 |
| 121 | 970 |
| 121 | 990 |
| 121 | 1000 |
| 122 | 1000 |
| 122 | 1000 |
| 122 | 990 |
| 123 | 990 |
| 123 | 990 |
| 123 | 940 |
| 124 | 900 |
| 124 | 900 |
| 124 | 860 |
| 126 | 750 |
| 126 | 750 |
| 127 | 750 |
| 127 | 750 |
| 127 | 750 |
| 128 | 740 |
| 128 | 740 |
| 128 | 740 |
| 129 | 740 |
| 129 | 740 |
| 129 | 740 |
| 130 | 740 |
| 130 | 760 |
| 130 | 760 |
| 131 | 760 |
| 131 | 760 |
| 136 | 870 |
| 136 | 880 |
| 136 | 900 |
| 137 | 900 |
| 137 | 910 |
| 138 | 950 |
| 138 | 980 |
| 138 | 970 |
| 139 | 930 |
| 139 | 920 |
| 139 | 920 |
| 139 | 880 |
| 140 | 870 |
| 140 | 870 |
| 140 | 820 |
| 141 | 820 |
| 141 | 820 |
| 141 | 820 |
| 142 | 790 |
| 142 | 790 |
| 142 | 770 |
| 154 | 760 |
| 154 | 770 |
| 154 | 770 |
| 155 | 780 |
| 155 | 780 |
| 155 | 780 |
| 156 | 790 |
| 156 | 800 |
| 156 | 800 |
| 156 | 790 |
| 157 | 820 |
| 157 | 840 |
| 157 | 840 |
| 158 | 890 |

-continued

| Raw Data | |
|---|---|
| Time | RSSI |
| 158 | 890 |
| 158 | 900 |
| 159 | 930 |
| 159 | 930 |
| 160 | 920 |
| 160 | 880 |
| 163 | 740 |
| 163 | 740 |
| 164 | 740 |
| 164 | 740 |
| 165 | 740 |
| 165 | 740 |
| 165 | 740 |
| 166 | 750 |
| 166 | 750 |
| 166 | 750 |
| 167 | 750 |
| 167 | 750 |
| 167 | 750 |
| 168 | 760 |
| 168 | 770 |
| 169 | 760 |
| 172 | 860 |
| 175 | 880 |
| 175 | 850 |
| 176 | 840 |
| 176 | 860 |
| 177 | 880 |
| 177 | 900 |
| 177 | 910 |
| 178 | 890 |
| 178 | 890 |
| 178 | 880 |
| 179 | 860 |
| 179 | 840 |
| 180 | 840 |
| 180 | 820 |
| 180 | 800 |
| 181 | 780 |
| 190 | 810 |
| 190 | 790 |
| 191 | 810 |
| 191 | 830 |
| 192 | 830 |
| 192 | 840 |
| 192 | 850 |
| 193 | 850 |
| 193 | 850 |
| 193 | 860 |
| 194 | 850 |
| 194 | 830 |
| 195 | 820 |
| 195 | 800 |
| 195 | 790 |
| 196 | 770 |
| 203 | 760 |
| 204 | 760 |
| 204 | 770 |
| 205 | 770 |
| 205 | 790 |
| 206 | 800 |
| 206 | 830 |
| 207 | 820 |
| 207 | 840 |
| 208 | 850 |
| 208 | 850 |
| 221 | 800 |
| 222 | 800 |
| 222 | 790 |
| 223 | 790 |
| 223 | 790 |
| 224 | 780 |
| 224 | 780 |
| 225 | 770 |
| 225 | 760 |

-continued

| Raw Data | |
|---|---|
| Time | RSSI |
| 226 | 760 |
| 231 | 850 |
| 232 | 850 |
| 232 | 850 |
| 233 | 850 |
| 233 | 860 |
| 234 | 860 |
| 234 | 830 |
| 235 | 860 |
| 235 | 850 |
| 236 | 830 |
| 236 | 820 |
| 249 | 870 |
| 250 | 870 |
| 250 | 870 |
| 251 | 880 |
| 251 | 860 |
| 252 | 850 |
| 252 | 850 |
| 253 | 810 |
| 253 | 790 |
| 254 | 770 |
| 254 | 760 |
| 260 | 770 |
| 261 | 780 |
| 261 | 780 |
| 262 | 780 |
| 262 | 810 |
| 263 | 830 |
| 263 | 830 |
| 264 | 840 |
| 264 | 850 |
| 265 | 860 |
| 265 | 840 |
| 279 | 840 |
| 280 | 820 |
| 280 | 810 |
| 281 | 820 |
| 281 | 810 |
| 282 | 780 |
| 282 | 770 |
| 283 | 770 |
| 283 | 750 |
| 284 | 750 |
| 284 | 740 |
| 292 | 870 |
| 293 | 870 |
| 293 | 850 |
| 294 | 870 |
| 294 | 890 |
| 295 | 860 |
| 295 | 850 |
| 296 | 850 |
| 296 | 800 |
| 297 | 780 |
| 297 | 780 |
| 310 | 790 |
| 311 | 790 |
| 311 | 790 |
| 312 | 810 |
| 312 | 830 |
| 313 | 860 |
| 313 | 860 |
| 314 | 870 |
| 314 | 860 |
| 315 | 870 |
| 315 | 830 |
| 325 | 750 |
| 326 | 760 |
| 326 | 770 |
| 327 | 770 |
| 327 | 760 |
| 328 | 780 |
| 328 | 800 |
| 329 | 840 |

-continued

| Raw Data | |
|---|---|
| Time | RSSI |
| 329 | 840 |
| 330 | 840 |
| 330 | 830 |
| 333 | 810 |
| 334 | 830 |
| 334 | 840 |
| 335 | 810 |
| 336 | 830 |
| 336 | 870 |
| 337 | 860 |
| 337 | 880 |
| 338 | 910 |

The invention claimed is:

1. An access control switch controller comprising:
a locking mechanism present at a location with an antenna for receiving a signal from a transmitting radio frequency device; and
a processor configured to:
determine raw values of the signal strength of said signal over time,
from the raw values of signal strength over time, calculating a plurality of technical indicators indicating trends in the signal strength at said location, and
output a trigger signal controlling access, via the locking mechanism, said trigger signal invoked by programmed trigger rules which arc based on said trends,
wherein the switch controller processor is associated with a door lock and the trigger signal opens and/or closes the door lock.

2. The access control switch controller of claim 1 in which one said technical indicator is an exponential moving average of the signal strength over time.

3. The access control switch controller of claim 1 in which one said technical indicator is a moving average convergence divergence of the signal strength over time.

4. The access control switch controller of claim 1 in which the technical indicators include financial market technical indicators.

5. The access control switch controller of claim 1 in which the transmitting radio frequency device transmits in the 2.4 GHz radio bands.

6. The access control switch controller of claim 1 in which the transmitting radio frequency device supports a radio frequency communication method selecting from the group consisting of: General Packet Radio Service, GSM, CMDA, Bluetooth, ZigBee, Wifi, 802.11x.

7. The access control switch controller of claim 1 in which the processor is further configured to initiate a pairing algorithm with the transmitting radio frequency device.

8. The access control switch controller of claim 1 in which the processor is further configured to provide personal area networking connection to serve HTML pages to administer a configuration of switch controllers.

9. A method of electronically controlling a lock a door lock, the method comprising:
receiving at a single door lock controller a signal from a transmitting radio frequency device;
determining raw values of the signal strength of said signal over time;
from the raw values of the signal strength over time, calculating a plurality of technical indicators; and
outputting a trigger signal opening and/or closing the door lock, said trigger signal invoked by programmed trigger rules including one or more said technical indicators.

10. The method of claim 9 in which one said technical indicator is an exponential moving average of the signal strength over time.

11. The method of claim 9 in which one said technical indicator is a moving average convergence divergence of the signal strength over time.

12. The method of claim 9 in which the technical indicators include financial market technical indicators.

13. The method of claim 9 in which the transmitting radio frequency device transmits in the 2.4 GHz radio bands.

14. The method of claim 9 in which the transmitting radio frequency device supports a radio frequency communication method selecting from the group consisting of: General Packet Radio Service, GSM, CMDA, Bluetooth, ZigBee, Wifi, 802.11x.

15. The method of claim 9 in which a pairing algorithm is initiated with the transmitting radio frequency device.

16. The method of claim 9 further including providing a personal area networking connection to serve HTML pages to administer a configuration of switch controllers.

17. An access control unit receiving signals from a transmitting radio frequency device and controlling access by locking and unlocking a lock, the access control unit comprising:
an antenna for receiving a signal from the transmitting radio frequency device; and
a processor configured to:
determine the signal strength of the received signal as a measure of distance,
determine the signal strength of the received signal over time as a measure of speed,
based on said determinations, calculate a plurality of technical indicators including an exponential moving average of the received signal strength over time and a moving average convergence divergence of the signal strength over time,
measure the proximity of the transmitting radio frequency device using a plurality of different trigger rules each based on one more said technical indicators, and
based on the measured proximity controlling the lock.

18. The access control unit of claim 17 in which the technical indicators include financial market technical indicators.

19. The access control unit of claim 17 in which the transmitting radio frequency device transmits in the 2.4 GHz radio bands.

20. The access control unit of claim 17 in which the transmitting radio frequency device supports a radio frequency communication method selecting from the group consisting of: General Packet Radio Service, GSM, CMDA, Bluetooth, ZigBee, Wifi, 802.11x.

21. The access control unit of claim 17 in which the processor is further configured to initiate a pairing algorithm with the transmitting radio frequency device.

22. The access control unit of claim 17 in which the processor is further configured to provide personal area networking connection to serve HTML pages to administer a configuration of switch controllers.

* * * * *

UNITED STATES PATENT AND TRADEMARK OFFICE
CERTIFICATE OF CORRECTION

| | |
|---|---|
| PATENT NO. | : 8,792,826 B2 |
| APPLICATION NO. | : 12/295670 |
| DATED | : July 29, 2014 |
| INVENTOR(S) | : Nicholas Hedley Willis |

It is certified that error appears in the above-identified patent and that said Letters Patent is hereby corrected as shown below:

In the Claims

Claim 9, Column 27, line 59, "A method of electronically controlling a lock a door lock" should read --A method of electronically controlling a door lock--

Signed and Sealed this
Fourth Day of November, 2014

Michelle K. Lee
*Deputy Director of the United States Patent and Trademark Office*